E. SPRAGUE.
BOTTOM BOARDS FOR BRICK-MOLDS.
No. 186,023. Patented Jan. 9, 1877.
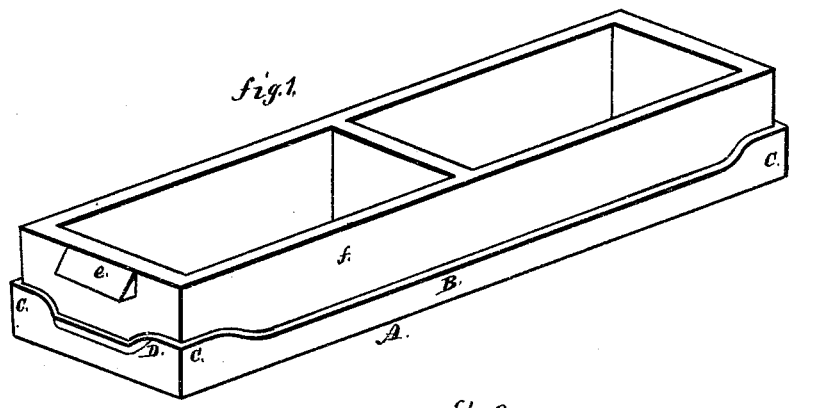
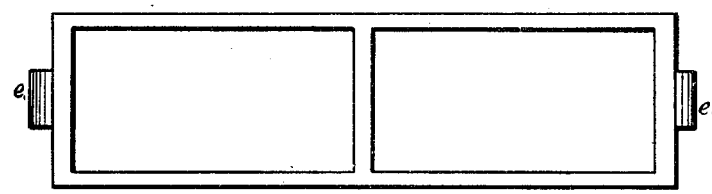
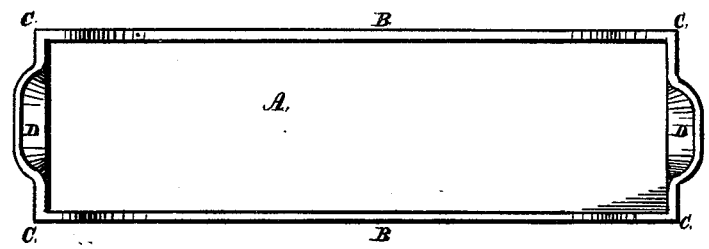
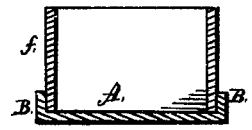
Witnesses
James J. Johnston
Wesley Johnston
Inventor
Edwin Sprague
By A. C. Johnston
His Attorney

UNITED STATES PATENT OFFICE.

EDWIN SPRAGUE, OF PITTSBURG, PENNSYLVANIA.

IMPROVEMENT IN BOTTOM BOARDS FOR BRICK-MOLDS.

Specification forming part of Letters Patent No. 186,023, dated January 9, 1877; application filed September 4, 1876.

*To all whom it may concern:*

Be it known that I, EDWIN SPRAGUE, of Pittsburg, in the county of Allegheny and State of Pennsylvania, have invented a new and useful Improvement in Molds for Brick-Machines; and I do hereby declare that the following is a full and exact description thereof, reference being had to the accompanying drawings, and to the letters of reference marked thereon.

My invention relates to an improvement in bottom boards for brick-molds used in combination with brick-machines; and consists in surrounding the edge of the board with a flange, with that part of it which incloses the corners and ends of greater depth than the sides, the ends of the flanged board recessed for forming lifts, and which also receive the lifts of the brick-mold.

To enable others skilled in the art to make and use my invention, I will describe its construction and operation.

In the accompanying drawings, which form part of my specification, Figure 1 is a perspective view of the bottom board and mold arranged in juxtaposition with relation to each other. Fig. 2 is a top view of the mold. Fig. 3 is a top view of the bottom board. Fig. 4 is a transverse section of the mold and bottom board.

In brick-machines of that class described in Letters Patent No. 85,142, granted to me December 22, 1868, experience has demonstrated that in the operation of delivering the filled molds from the machine it becomes a necessity to have the bottom board surrounded with a flange, so as to deliver the mold and board simultaneously; otherwise the mold is liable to be shifted off the bottom board, both in the delivery from the machine, and in the operation of supplying the machine with molds.

The essential feature of my improvement consists in a means for holding the mold in a fixed position with relation to the bottom board while being supplied to the machine, and while being delivered from it.

In the drawings, A represents the bottom board, the outer edge of which is surrounded with a flange, B, which, at the corners $c$, is of greater depth than at the sides and ends. The bottom board is provided with handles or lifts D. $f$ represents the mold, which is of ordinary construction, having handles or lifts at $e$.

The object of the flange B and its relation to the bottom board and mold are hereinbefore stated, and it is unnecessary to give a further description of its object and advantage.

Having thus described my improvement, what I claim as of my invention is—

As an improved article of manufacture, the bottom board A, provided with a flange, B, projecting a short distance upward on each end and side, and having lifts or handles D, in combination with the brick-mold $f$, substantially as and for the purpose specified.

EDWIN SPRAGUE.

Witnesses:
 A. C. JOHNSTON,
 JNO. D. PATTEN.